United States Patent [19]
Ohashi et al.

[11] Patent Number: 5,460,135
[45] Date of Patent: Oct. 24, 1995

[54] LIQUID FUEL STORAGE DEVICE

[75] Inventors: Tamiyoshi Ohashi; Sukehiro Sawada, both of Aichi; Osamu Hokari, Kanagawa, all of Japan

[73] Assignees: Toyoda Gosei Co., Ltd., Minamiooi; Isuzu Motors Limited, Shinagawa, both of Japan

[21] Appl. No.: 338,741

[22] Filed: Nov. 9, 1994

[30] Foreign Application Priority Data

Nov. 9, 1993 [JP] Japan .................... 5-279913

[51] Int. Cl.⁶ .................... B60K 15/00; F02M 33/02
[52] U.S. Cl. .................... 123/518
[58] Field of Search .................... 123/516, 518, 123/519

[56] References Cited

U.S. PATENT DOCUMENTS

| | | | |
|---|---|---|---|
| 3,617,034 | 11/1971 | Skinner | 123/518 |
| 3,949,720 | 4/1976 | Zipprich et al. | 123/518 |
| 3,977,379 | 8/1976 | Weissenbach | 123/518 |
| 5,056,493 | 10/1991 | Holzer | 123/518 |
| 5,090,459 | 2/1992 | Aoki et al. | 141/59 |

FOREIGN PATENT DOCUMENTS 64-16426  1/1989  Japan .

Primary Examiner—Thomas N. Moulis
Attorney, Agent, or Firm—Cushman, Darby & Cush

[57] ABSTRACT

A liquid fuel storage device is provided for use with an automobile system including an engine, a fuel tank, and a canister for absorbing fuel vapor during refueling. The device includes an air bag disposed in the fuel tank and constructed and arranged to inflate to occupy a space in the fuel tank in accordance with an amount fuel remaining in the fuel tank. Piping structure communicates the fuel tank with the engine for inflating the air bag by reducing pressure in the fuel tank when the engine is started. An air introduction pipe communicates with the atmosphere and includes a first valve mechanism for introducing air into the air bag and prevents air from escaping from the air bag after inflation thereof. An air emission pipe includes a second valve mechanism, which is opened only in refueling to emit air in the air bag during refueling. The air emission pipe is connected to the canister.

6 Claims, 2 Drawing Sheets

LIQUID FUEL STORAGE DEVICE

BACKGROUND OF THE INVENTION

1. Field of the Invention

The present invention relates to a liquid fuel storage device including a fuel tank and a canister for use with a vehicle.

2. Description of Related Art

In order to fill-up a fuel tank with fuel smoothly, it is necessary that fuel vapor in the fuel tank be instantly emitted to the outside of the fuel tank to enable the fuel vapor to be replaced with the fuel without resistance. Further, since the fuel is vigorously ejected from a fuel gun inserted into a fuel port of the fuel tank in refueling, a lot of fuel mist is produced. Since the emission of fuel vapor and mist (hereinafter, referred to as "fuel gas") to the atmosphere causes an environmental problem, the fuel gas is generally introduced to a canister and adsorbed and captured thereby as in U.S. Pat. No. 5,090,459.

When refueling is necessary, since a fuel tank is usually almost entirely filled with a fuel gas, a large canister must be designed, taking the capacity of the fuel tank into consideration.

However, a large canister is not preferable to satisfy a trade-off request to increase the capacity of a fuel tank as well as the space in a vehicle.

To cope with this problem, a liquid fuel storage device for a vehicle has been proposed having a mechanism for inflating and deflating an air bag disposed in a tank according to a surplus space produced by an amount of storage fuel. This type of storage device has been disclosed, for example, in Japanese Patent Unexamined Publication No. 64-16426 (1989) wherein the space in a fuel tank filled with fuel gas (i.e., the space obtained by subtracting the amount of remaining fuel from the total capacity of the tank) can be reduced in refueling.

The fuel storage device arranged as described above usually requires pressurizing means (a pressurizing pump or the like) for pressurizing the air bag (by which the space occupied by the fuel storage unit as a whole is increased). Further, since the air bag communicates directly with the atmosphere to emit air in refueling, a fuel gas in the air bag which passes through an air bag film is simultaneously emitted.

SUMMARY OF THE INVENTION

In view of the above problem, an object of the present invention is to provide a liquid fuel storage device including a mechanism for inflating and deflating an air bag disposed in a fuel tank according to an amount of stored fuel, the liquid fuel storage device being arranged such that it does not need pressurizing means and does not raise the possibility of a fuel gas passing though the air bag being emitted to the atmosphere simultaneously with the emission of air to the atmosphere.

To solve the above problem, in accordance with the present invention, a liquid fuel storage device is provided which comprising:

a fuel tank;

a canister for absorbing fuel vapor as the fuel tank is refilled with fuel;

an air bag disposed in the fuel tank and constructed and arranged to inflate to occupy a space in the fuel tank according an amount of remaining fuel;

piping structure communicating the fuel tank with the engine for inflating the bag by reducing the pressure in the fuel tank;

an air introduction pipe communicating with the atmosphere and provided with a first valve mechanism for introducing air into the air bag and preventing air from flowing out of the air bag after the air bag is inflated; and an air emission pipe provided with a second valve mechanism which is opened only in refueling to emit the air in the air bag in refueling and which is connected to the canister.

DETAILED DESCRIPTION OF THE INVENTION

Figure 1:
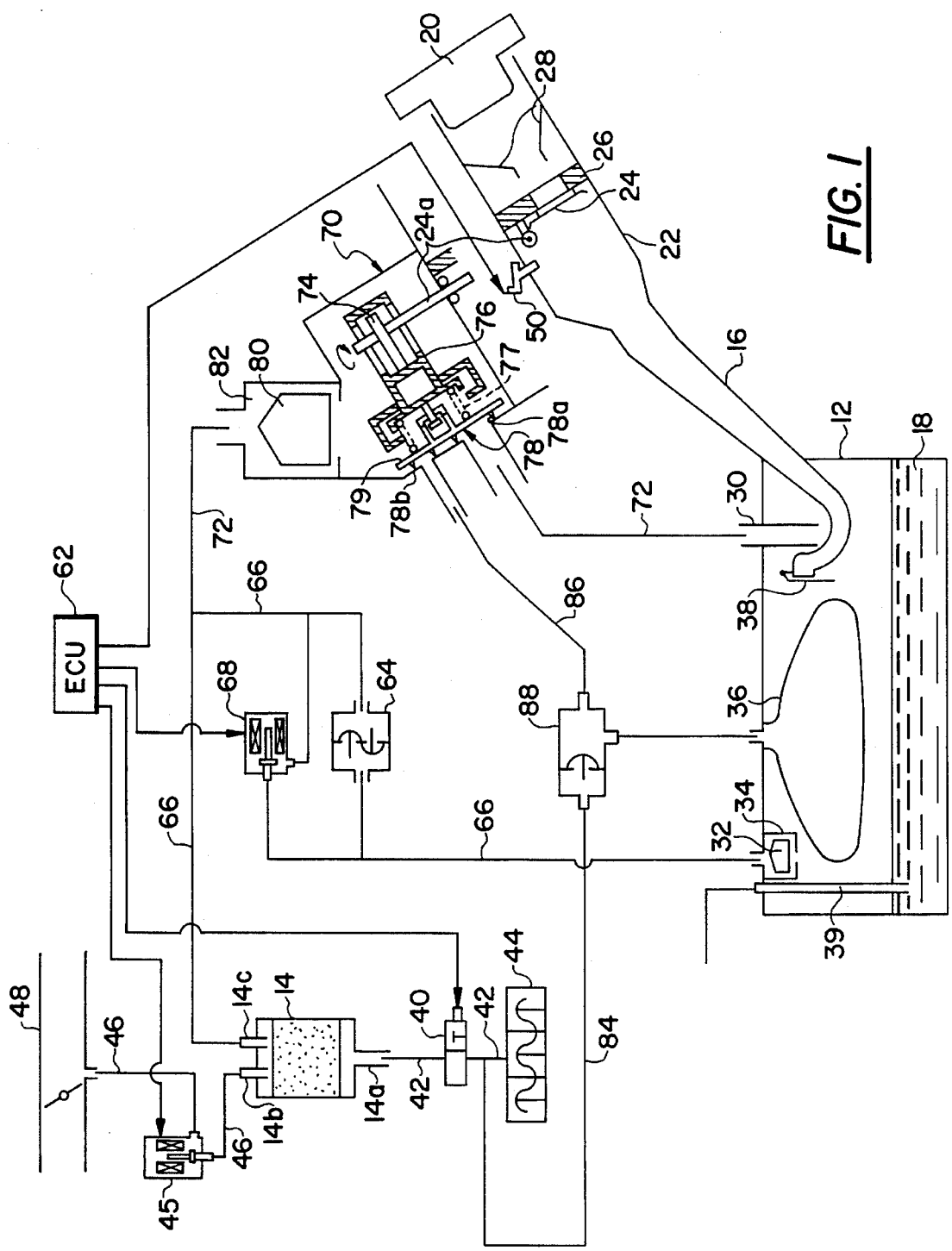
FIG. 1 is a system schematic diagram showing a liquid fuel storage device according to the present invention after an air bag is inflated.
Figure 2:
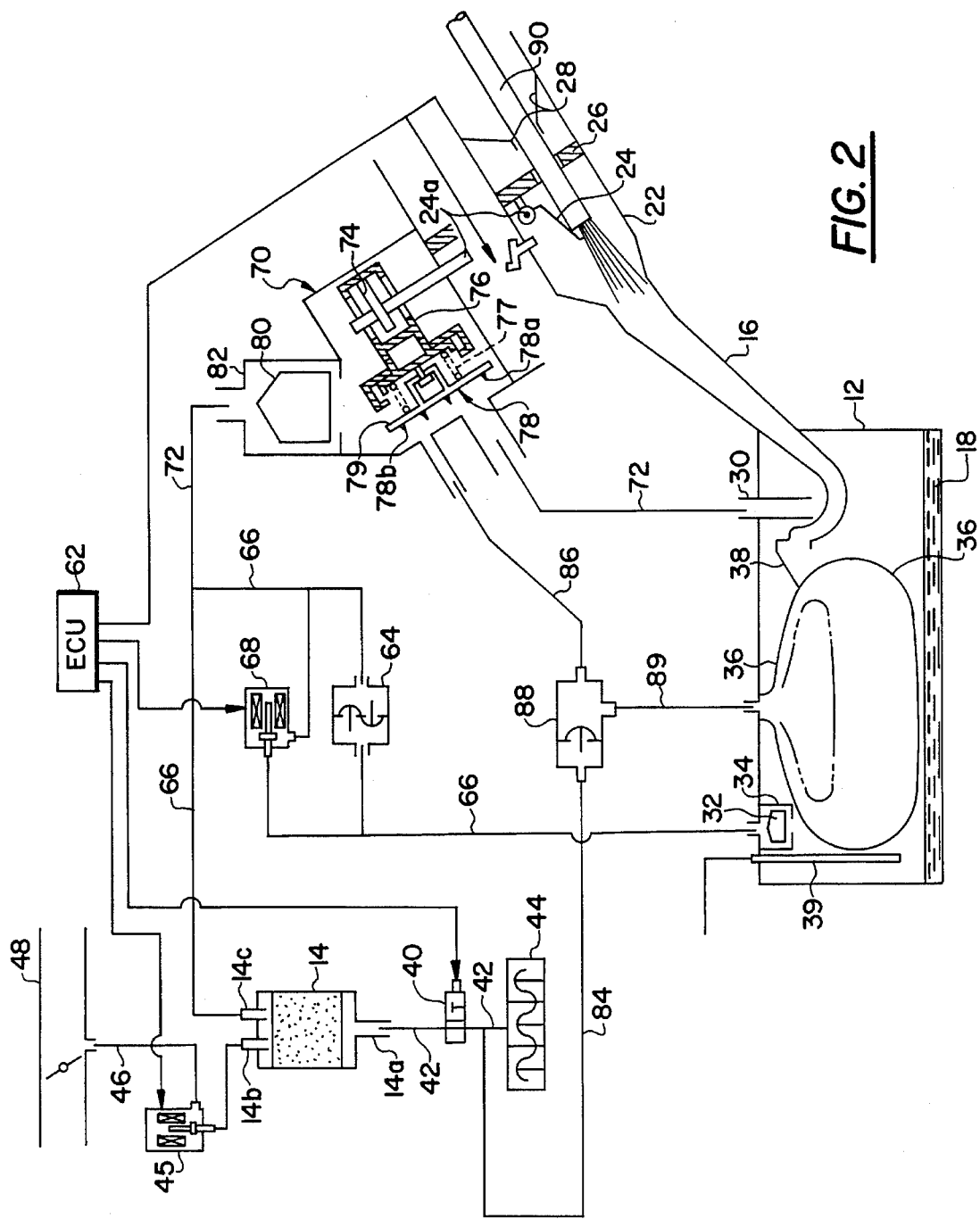
FIG. 2 is the system schematic diagram of FIG. 1 shown during refueling.

The present invention will be described below in detail with reference to an embodiment shown in FIGS. 1 and 2.

The liquid fuel storage device of the invention includes a fuel tank 12 and a canister 14.

Although the present invention is described with reference to a liquid fuel storage device provided with a mechanism for keeping an interior of a fuel tank at a predetermined, reduced pressure state for a predetermined time when an engine starts, so as to check for abnormal leakage of the fuel tank, the present invention is not limited thereto. Note, the fuel tank leakage check mechanism is one of the mechanisms developed for an on-board-diagnosis system established by the United States Government for controlling air pollution generated by vehicles. The system will be described below in detail.

A fuel tank 12 having a fuel filler pipe 16 stores liquid fuel 18 and feeds the fuel 18 to the engine of a vehicle (not shown). The fuel filler pipe 16 includes a filler neck 22 provided with a fuel cap 20. A seal member 26 provided with a trap door 24 and a protective cylindrical member 28 for protecting the seal member 26 are attached to the filler neck 22. Further, a bleeder pipe 30 serving as a bleeder port in refueling is disposed in the vicinity of the extreme end of the fuel filler pipe 16 above the upper wall of the fuel tank 12 and a fuel shut-off valve 34 to which a float 32 is assembled is disposed at position apart from the extreme end of the fuel filler pipe 16, respectively. A baffle 38 for preventing an abrupt back flow of the liquid fuel in the fuel tank 12 is attached to the downstream end of the fuel filler pipe 16. Note, numeral 39 denotes a fuel return pipe.

A canister 14 temporarily adsorbs and captures fuel gas produced in the fuel tank 12. An air inlet port 14a is formed at a bottom the canister 14 and is connected to an air cleaner 44 through an air inlet pipe 42, provided with a two-position switching valve (solenoid operation type) 40. The two-position switching valve 40 is opened and closed in response to a signal (electric signal) sent by an engine controller unit (hereinafter, abbreviated as "ECU").

A fuel gas emission port 14b and a fuel gas introduction port 14c are formed at an upper wall of the canister 14. The fuel gas emission port 14b is connected to an air inlet pipe 48 through a fuel gas emission pipe 46 provided with a flow rate/pressure reduction control valve (electromagnetic valve) 45. The air inlet pipe 48 defines a reduced pressure generation chamber communicating with the engine. The flow rate/pressure reduction control valve 45 has two roles: (a) it controls a flow rate of fuel gas separated from the canister 14; and (b) it controls pressure in the fuel tank in such a manner that the control valve 45 is opened and closed in response to a sensing signal from a pressure sensor 50 attached to an inside of the seal member 26 of the filler neck 22 by a signal sent from the ECU 62, in order to check for leakage of the fuel tank 12.

The fuel tank 12 and the fuel gas introduction port 14c of the canister 14 are connected to the fuel shut-off valve 34 of the fuel tank 12 through a fuel vapor pipe 66 provided with a positive/negative pressure control valve (spring-biased two-way valve) 64. A gas introduction valve (electromagnetic valve) 68 is connected to the fuel vapor pipe 66 in parallel with the positive/negative pressure control valve 64. The gas introduction pipe 68 is also opened and closed in response to a signal sent from the ECU 62 (opened when the engine is in operation).

The bleeder pipe 30 of the fuel tank 12 is connected to the fuel introduction port 14c of the canister 14 through a bleeder pipe 72 provided with a gas shut-off valve 70 which is normally closed and only opened during refueling. Since only one fuel gas introduction port 14c is provided with the canister 14 in the illustrated example, the port 14c joins the fuel vapor pipe 66 on the canister 14 side. However, two sets of fuel gas introduction ports may be provided and connected to completely different pipes.

The gas shut-off valve 70 may be of any construction, in the illustrated embodiment, the valve 70 is opened and closed in such a manner that a valve plug driving lever 76, which is biased in a valve plug closing direction by a circular cam 74 fixed to the rotary shaft 24a of the trap door 24, moves a seal valve plug 78 upwardly and downwardly. In the illustrated embodiment, numeral 77 denotes a coil spring for easing the bias and impact on the seal valve plug 76.

In the illustrated embodiment, the gas shut-off valve 70 is provided with a fuel check valve 82 accommodating a float 80 so that fuel does not flow out to the canister 14 when the vehicle turns sideways, or the like.

In the liquid fuel storage device arranged as described above, the embodiment is characterized in the following arrangement.

The storage device includes an air bag 36 disposed in the fuel tank 12, the pressure reduction pipe (fuel vapor pipe) 66 for reducing pressure in the fuel tank 12 to inflate the air bag 36, an air introduction pipe 84 communicating with the atmosphere to introduce air into the air bag 36, and an air emission pipe 86 for emitting the air in the air bag only during refueling.

The air bag 36 is preferably made of a resin film of polyvinyl fluoride, polyamide, polyethylene, polyvinyl chloride etc. A synthetic fiber cloth of polyamide, polyester etc. having a resistance to fuel, with the inside thereof coated with fuel resistant rubber may also be used.

In this embodiment, the pressure reduction pipe need not be provided, since the aforesaid fuel vapor pipe 66 can serve as the pressure reduction pipe.

The air introduction pipe 84 is connected to the air inlet pipe 42 between the air cleaner 44 and the two-position switching valve 40. The air inlet pipe 84 is provided with a valve mechanism for preventing the air bag 36 to be deflated after the air bag has been inflated. The valve mechanism is in the form of a spring-biased one way valve (check valve) 88.

The air emission pipe 86 is connected to the bleeder pipe 72 through an air emission valve 78b, wherein a seal valve plug 78, a bleeder valve plug 78a and an air emission valve plug 78b of the shut-off valve 70 connected to the bleeder pipe 72 are formed in parallel with each other on a single valve sheet 79.

As described above, although the gas shut-off valve 70 is mechanically opened and closed by the circular cam 74 associated with the rotary shaft 24a of the trap door 24, the gas shut-off valve 70 is not particularly limited to this arrangement and may be opened and closed by an electromagnetic mechanism or the like.

Next, operation of the embodiment will be described.

When the engine is started, the two-position switching valve 40 in the air inlet pipe 42 of the canister 14 is closed in response to a signal sent from the ECU 62, the flow rate/pressure reduction control valve 45 communicating with the fuel gas pipe 46 is opened, and the gas introduction pipe 68 disposed in the fuel vapor pipe 66 connecting the fuel gas introduction port 14c of the canister 14 to the fuel shut-off valve 34 of the fuel tank 12, is opened. As a result, the air inlet pipe 48 exposed to a reduced pressure is caused to communicate with the fuel tank 12 so that the pressure in the fuel tank 12 is reduced (lower than the atmospheric pressure) defining a reduced pressure state. When the ECU 62 receives a sensing signal from the pressure sensor 50 to check the presence of abnormal leakage of the fuel tank 62, the ECU 62 controls the reduced pressure state by inputting a command signal to the flow rate/pressure reduction control valve 45 as well as determines a change of the reduced pressure state for a predetermined time, and when leakage arises, the ECU 62 issues warning through a warning lamp or the like.

Since the reduced pressure state in the fuel tank 12 is maintained for a predetermined time as described above, the air bag 36 will inflate so that pressure in the air bag 36 is also reduced. Thus, the one-way valve 88 is automatically opened against a spring force so that the atmosphere flows into the air bag 36 through the air cleaner 44 to inflate the air bag 36 according to an amount of remaining fuel in the fuel tank.

Then, after the reduced pressure state is maintained for a predetermined time, that is, in response to a signal sent from the ECU 62 which indicates that the predetermined time has elapsed after starting the engine, the two-position switching valve 40 in the air inlet pipe 42 is opened. Thus, the air inlet pipe 42 communicates with the air inlet pipe 48 so that the pressure in the air introduction pipe 84 for the air bag 36 connected to the air inlet pipe 42 is also reduced. As a result, in the air introduction pipe 84, the one-way valve 88 is also automatically closed by a spring force due to the above reduced pressure state, and even if fuel gas is produced while the vehicle travels, parks or stops (except a time of refueling) and the pressure in the fuel tank 12 is made positive, air in the air bag 36 does not escape. Naturally, the gas shut-off valve 70 of the air emission pipe 86 communicating with the air bag 36 is closed (refer to FIG. 1).

When fuel is consumed as the vehicle travels and a space is created in the fuel tank 12 to permit the air bag 36 to inflate, the air bag is inflated by a pressure difference between the inside and the outside of the air bag 36 each time the engine is started and the space in the fuel tank 12 in which fuel can evaporate, is greatly reduced. When fuel violently evaporates and the pressure in the tank is increased excessively, a positive/negative pressure control valve 64 in the fuel vapor pipe 66 is operated and fuel vapor is emitted into the canister 14 through the fuel gas introduction port 14c and adsorbed and captured by the canister 14.

Next, when the fuel cap 20 is removed for refueling and a fuel gun 90 is inserted into the fuel filler 16, the protective cylindrical member 28 advances to push and open the trap door 24. At this time, since the circular cam 74 is rotated in association with the rotation of the rotary shaft 24a of the trap door 24, the valve plug driving lever 76 lifts the seal valve plug 78 upwardly through locking means by the long diameter portion of the circular cam 74. Therefore, the bleeder valve plug 78a and the air emission valve plug 78b are in open positions and the fuel tank 12 and the air bag 36 are caused to communicate with the canister 14 through the bleeder pipe 72 (refer to FIG. 2).

When refueling is started, fuel vapor in the fuel tank 12 and mist produced in refueling are introduced into the canister 14 through the bleeder pipe 30, the shut-off valve, in an open state, and the bleeder pipe 72. On the other hand, the air bag 36 is deflated by a refueling pressure and air in the air bag 36 is introduced into the canister 14 through the air emission pipe 86, the gas shut-off valve 70 and the bleeder pipe 72.

Consequently, even if air in the air bag 36 is mixed with fuel gas, since the fuel gas is introduced into the canister 14 and adsorbed and captured by the canister 14, the emission of fuel gas into the atmosphere can be minimized.

Since the liquid fuel storage device according to the present invention is arranged as described above, the device achieves the following meritorious effects.

Since the air bag is inflated in such a manner that pressure in the fuel tank is reduced by making use of the pressure reduction pipe through which the fuel tank is connected to the pressure reduction chamber and the engine, a special pressurizing unit is not required.

The fuel vapor pipe for connecting the fuel tank to the canister can be used as the pressure reduction pipe and the bleeder pipe connected to the canister can be used as the air emission pipe for emitting air in the air bag during refueling. Consequently, when the fuel storage unit is mounted on a vehicle, any additional space is not fully occupied.

Since the valve mechanism, opened only during refueling is provided and air in the air bag is emitted during refueling through the air emission pipe connected to the canister, fuel gas passing through the air bag is captured by the canister. Thus, there is not a possibility that fuel gas is emitted to the atmosphere when air is emitted from the air bag.

The size of the canister can be reduced by the reduction of an amount of fuel gas in the fuel tank.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A liquid fuel storage device for use with an automobile system having an engine, a fuel tank, and a canister for absorbing fuel vapor during refueling, the device comprising:

an air bag disposed in the fuel tank and constructed and arranged to inflate to occupy a space in the fuel tank in accordance with an amount fuel remaining in the fuel tank;

piping structure connecting the fuel tank with the engine for inflating said air bag by reducing pressure in the fuel tank when the engine is started;

an air introduction pipe communicating with the atmosphere and including a first valve mechanism for introducing air into said air bag and preventing air from escaping from said air bag after inflation thereof; and an air emission pipe including a second valve mechanism, which is opened only in refueling to emit air in said air bag during refueling, said air emission pipe being connected to the canister.

2. A liquid fuel storage device according to claim 1, wherein said first valve mechanism is a one-way valve connected to an air cleaner.

3. A liquid fuel storage device according to claim 1, wherein said second valve mechanism is a gas shut-off valve associated with a trap door disposed in a fuel filler portion of said fuel tank.

4. A liquid fuel storage device according to claim 2, wherein said air introduction pipe is connected to said air cleaner through said first valve mechanism as well as to said canister through a two-position switching valve.

5. A liquid fuel storage device according to claim 1, wherein the fuel tank is connected to said second valve mechanism.

6. A liquid fuel storage device according to claim 1, wherein said pressure reduction pipe is connected to said second valve mechanism through a fuel check valve.

* * * * *